United States Patent
Hu et al.

(10) Patent No.: US 11,780,768 B2
(45) Date of Patent: Oct. 10, 2023

(54) PHOTODARKENING-RESISTANT YTTERBIUM-DOPED QUARTZ OPTICAL FIBER AND PREPARATION METHOD THEREFOR

(71) Applicant: Shanghai Institute of Optics and Fine Mechanics, Chinese Academy of Sciences, Shanghai (CN)

(72) Inventors: Lili Hu, Shanghai (CN); Fengguang Lou, Shanghai (CN); Chunlei Yu, Shanghai (CN); Meng Wang, Shanghai (CN); Lei Zhang, Shanghai (CN); Xiaoqing Xu, Shanghai (CN); Danping Chen, Shanghai (CN); Fan Wang, Shanghai (CN); Mengting Guo, Shanghai (CN)

(73) Assignee: SHANGHAI INSTITUTE OF OPTICS AND FINE MECHANICS, CHINESE ACADEMY OF SCIENCES, Shanghai (CN)

( * ) Notice: Subject to any disclaimer, the term of this patent is extended or adjusted under 35 U.S.C. 154(b) by 120 days.

(21) Appl. No.: 16/972,358

(22) PCT Filed: Jun. 6, 2019

(86) PCT No.: PCT/CN2019/090432
§ 371 (c)(1),
(2) Date: Dec. 4, 2020

(87) PCT Pub. No.: WO2019/233487
PCT Pub. Date: Dec. 12, 2019

(65) Prior Publication Data
US 2021/0230051 A1    Jul. 29, 2021

(30) Foreign Application Priority Data
Jun. 6, 2018  (CN) .......................... 201810587237.2

(51) Int. Cl.
*C03C 13/04*      (2006.01)
*C03B 37/018*    (2006.01)
(Continued)

(52) U.S. Cl.
CPC .......... *C03C 13/046* (2013.01); *C03B 37/018* (2013.01); *C03B 37/025* (2013.01); *G02B 6/036* (2013.01); *C03B 2203/32* (2013.01)

(58) Field of Classification Search
CPC . C03B 37/018; C03B 37/025; C03B 2203/32; C03C 13/046; G02B 6/036
See application file for complete search history.

(56) References Cited

U.S. PATENT DOCUMENTS 6,160,944 A * 12/2000 Payne ................ G02B 6/02133
                                                                385/129
11,476,634 B2 * 10/2022 Dragic ................ H01S 3/06733
(Continued)

FOREIGN PATENT DOCUMENTS

CN        102135641 A         7/2011
CN        103373811 A    *  10/2013
(Continued)

OTHER PUBLICATIONS

Jetschke et al., "Photodarkening in Yb doped fibers: experimental evidence of equilibrium states depending on the pump power," Optics Express, vol. 15, No. 22, pp. 14838-14843 (2007).
(Continued)

*Primary Examiner* — Thomas A Hollweg
*Assistant Examiner* — Mary A El-Shammaa
(74) *Attorney, Agent, or Firm* — Panitch Schwarze Belisario & Nadel LLP

(57) ABSTRACT

A photodarkening-resistant ytterbium-doped quartz optical fiber and a method for prpearing such a fiber are provided. Glass of a photodarkening-resistant ytterbium-doped quartz
(Continued)

optical fiber core rod includes at least $Yb_2O_3$, $Al_2O_3$, $P_2O_5$, $SiO_2$. The proportions of $Yb_2O_3$, $Al_2O_3$, and $P_2O_5$ in the entire substance are $Yb_2O_3$: 0.05-0.3 mol %, $Al_2O_3$: 1-3 mol %, and $P_2O_5$: 1-5 mol %, respectively. In the preparation method for the photodarkening-resistant ytterbium-doped quartz optical fiber, a sol-gel method and an improved chemical vapor deposition method are combined. By using the molecular-level doping uniformity and the low preparation loss thereof respectively, ytterbium ions, aluminum ions and phosphorus ions are effectively doped in a quartz matrix, thereby effectively solving the problems in the optical fiber of high loss, photodarkening caused by cluster or the like, and a central refractive index dip.

10 Claims, 5 Drawing Sheets

(51) Int. Cl.
    *C03B 37/025*     (2006.01)
    *G02B 6/036*     (2006.01)

(56) References Cited

U.S. PATENT DOCUMENTS

| | | | | |
|---|---|---|---|---|
| 2003/0145628 A1* | 8/2003 | Anderson | ........... | G02B 6/03622 65/390 |
| 2004/0187524 A1* | 9/2004 | Sen | ........... | B82Y 30/00 65/390 |
| 2010/0135627 A1* | 6/2010 | Pastouret | ........... | H01S 3/06716 359/341.1 |
| 2011/0206341 A1* | 8/2011 | Ichii | ........... | H01S 3/06716 385/142 |
| 2021/0230051 A1 | 7/2021 | Lou et al. | | |

FOREIGN PATENT DOCUMENTS

| | | | | |
|---|---|---|---|---|
| CN | 106007352 A | | 10/2016 | |
| CN | 106116136 A | * | 11/2016 | ........... C03B 37/018 |
| CN | 107390315 A | | 11/2017 | |
| CN | 109502961 A | | 3/2019 | |

OTHER PUBLICATIONS

Leich et al., "Temperature influence on the photodarkening kinetics in Yb-doped silica fibers," Journal of Optical Society of America B, vol. 28, No. 1, pp. 65-68 (2011).

Piccoli et al., "Effective photodarkening suppression in Yb-doped fiber lasers by visible light injection," Optics Express, vol. 22, No. 7, pp. 7638-7634 (2014).

Xie et al., "Research Progress on Photodarkening of Yb-Doped Fiber," Material Sciences, vol. 7, No. 6, pp. 567-575 (2017) (with English Abstract).

Yoo et al., "Measurement of photodarkening in Yb-doped aluminosilicate fibres at elevated temperature," Electronic Letters, vol. 46, No. 3, 3 pages (2010).

* cited by examiner

PHOTODARKENING-RESISTANT YTTERBIUM-DOPED QUARTZ OPTICAL FIBER AND PREPARATION METHOD THEREFOR

CROSS-REFERENCE TO RELATED APPLICATIONS

This application is a Section 371 of International Application No. PCT/CN2019/090432, filed Jun. 6, 2019, which was published in the Chinese language on Dec. 12, 2019, under International Publication No. WO 2019/233487 A1, which claims priority under 35 U.S.C. § 119(b) to Chinese Application No. 201810587237.2, filed Jun. 6, 2018, the disclosures of each of which are incorporated herein by reference in their entireties.

FIELD

The invention relates to the field of optical fibers, in particular to a photodarkening-resistant ytterbium-doped quartz optical fiber and a preparation method therefor.

BACKGROUND OF THE INVENTION

Ytterbium-doped quartz optical fiber is the core component of 1 μm fiber laser. With the rapid development of energy optoelectronic technologies such as semiconductor laser pumping and laser coupling, the power of ytterbium-doped fiber lasers has also developed from the initial watt level to the 10,000 watt level. However, as the laser power increases, the output power of ytterbium-doped silica fiber decreases with the increase of operating time. This phenomenon is called photodarkening. The photodarkening phenomenon greatly restricts the life and stability of high-power ytterbium-doped fiber lasers.

The main reasons for the photodarkening phenomenon of ytterbium-doped silica fiber are as follows. The first is the color center (vacancy center). Regarding the cause of the color center, S. Yoo (Electronics Letters, 2010, Vol. 46, No. 3, 243) of the University of Southampton in the United Kingdom believes that the formation of color center is divided into two steps. Firstly, the oxygen defect in the ytterbium-doped fiber structure will release electrons under the irradiation condition, and then the adjacent ytterbium ion site will form the color center by trapping the electrons. The article (Optics Express, 2014, Volume 22, Issue 7, 7638) records that the trivalent ytterbium ion in optical fiber material gets electrons to change the valence state: $Yb^{3+} \rightarrow Yb^{2+}$, and forms a hole around the oxygen coordination bond, thereby inducing the color center, and the second is ytterbium ion clusters. The article (Optics Express, 2007, Volume 15, Issue 22, 14838) records that the photodarkening phenomenon in ytterbium-doped fiber is closely related to the clustering phenomenon of ytterbium ions. Its probability is positively related to the number of ytterbium ion pairs and the probability of rupture of certain ionic bonds. The higher the ytterbium ion concentration, the more obvious the cluster phenomenon, and the more serious the photodarkening phenomenon in the optical fiber. In addition, temperature is also an important factor affecting the photodarkening of ytterbium-doped silica fiber. The article (Journal of the Optical Society of America B, 2011, Volume 28, Issue 1, 65) compares the photodarkening phenomenon of ytterbium-doped fiber at different temperatures. The photodarkening rate initially accelerates with the increase of temperature, and then becomes saturated after reaching a certain temperature.

In view of the above photodarkening mechanism, the current methods to improve the photodarkening performance of ytterbium-doped silica fiber are mainly as follows:

The first (method) is the introduction of cerium ions. The incorporation of cerium ions will introduce redox couples $Ce^{3+}/Ce^{4+}$ into the ytterbium-doped silica fiber, which reduces the valence of ytterbium ions themselves, and reduces the color center caused by the valence of ytterbium ions, and thereby weakens the photodarkening in the ytterbium-doped fiber. Jinyan Li et al. (Patent CN 102135641 A, Application No. 201110076289.1) records a ytterbium-doped silica fiber prepared by co-doping cerium and yttrium plasma, achieving a slope efficiency of 82% and excellent photodarkening performance. The optical fiber can reduce the efficiency of working for 50 hours by less than 5% under the condition of 50 hours and 10 W output power, but the output laser power is still far away from (the requirements of) industrial applications (industrial applications require 1000 W output power to reduce efficiency by less than or equal to 5% for 500 hours).

The second is the introduction of aluminum oxide and phosphorus pentoxide. Aluminum oxide and phosphorus pentoxide break the dense structure of silica, thereby increasing the solubility of ytterbium ions in the silica structure and reducing the clusters between ytterbium ions. This method can suppress the photodarkening phenomenon to a certain extent. The patent (CN106116136 A, filing number 201610489887.4) introduces P. Under the same experimental conditions, the laser power drop rate is reduced from 56% (for samples without P doping) to 16%. The darkening phenomenon has been greatly improved, but there is still room for continued optimization.

The third is the introduction of alkali metals and alkaline earth metal elements. The patent (CN107390315 A, filing number 201710583330.1) states that the optical alkalinity of the environment in which the rare earth ions are located is changed, and the additional loss of photodarkening is reduced by doping alkaline metal ions into the core during the production of rare earth doped active optical fibers. However, the incorporation of alkaline metal ions undoubtedly leads to the problem of excessive fiber loss. The sample losses in the examples are all greater than 40 dB/km, which is still far from the current commercial ytterbium-doped silica fiber loss of less than 15 dB/km.

The fourth is to prepare highly uniformly doped ytterbium-doped silica fiber by a sol-gel method. Fenghou Xie et al. (Material Sciences, 2017, Vol. 7, Issue 6, 567) prepares ytterbium-doped silica fiber by using a sol-gel method, and comparing the photodarkening-resistant performances of the ytterbium-doped silica fibers with same component respectively prepared by MCVD method and sol-gel method, and found that the photodarkening induced loss of ytterbium-doped fiber prepared by sol-gel method is significantly lower than that of MCVD method. Ytterbium-doped fiber. The sol-gel method can achieve molecular-level uniformity, so that ytterbium ions are fully dispersed and the effect of clusters is reduced. However, the article does not report the loss of optical fiber and laser performance and other indicators. Although the sol-gel method can achieve molecular-level uniformity, the crucible contamination during the firing process of the core glass tends to cause high losses (of optical fiber).

The improved chemical vapor deposition system combined with the solution immersion method is a general method for preparing ytterbium-doped silica fiber. Among them, the method of ytterbium-aluminum-phosphorus-doped includes the following steps (CN106116136 A, application number 201610489887.4): first depositing a layer of silica soot body (porous body) in the deposition tube (1-2), soaking in a certain concentration of ytterbium chloride and aluminum chloride solution, injecting phosphorus oxychloride after soaked and blow-dried to complete phosphorus doping, and finally vitrifying and shrinking rod to complete the preparation of optical fiber preform. In this method, the aluminum ytterbium is soaked in the solution, and phosphorus is post-doped. It is difficult to achieve uniform doping. From the reported refractive index profile, it can be seen that the refractive index fluctuates greatly. And there is no report on the photodarkening-resistance of optical fiber.

In summary, the technical field needs to develop a method which can effectively solve the photodarkening of ytterbium-doped silica fiber.

SUMMARY

The purpose of the present invention is to provide an optical fiber that suppresses the photodarkening of the ytterbium-doped silica fiber and a preparation method therefor.

The first aspect of the present invention provides a photodarkening-resistant ytterbium-doped silica optical fiber is provided, and the glass of the fiber core rod at least includes $Yb_2O_3$, $Al_2O_3$, $P_2O_5$, $SiO_2$, wherein, the proportions of $Yb_2O_3$, $Al_2O_3$ and $P_2O_5$ in the entire substance are respectively: $Yb_2O_3$:0.05~0.3 mol %, $Al_2O_3$:1~3 mol %, $P_2O_5$:1~5 mol %.

The second aspect of the present invention provides a preparation method for the photodarkening-resistant ytterbium-doped silica optical fiber is provided. The preparation method at least includes: applying a sol-gel method and an immersion method to an improved chemical vapor deposition method to prepare a ytterbium-aluminum-phosphorus-doped silica soot body, and then after dehydration, decarburization, collapse, and optical fiber drawing, a photodarkening-resistant ytterbium-doped silica optical fiber is finally prepared.

In another preferred example, the preparation of the ytterbium-aluminum-phosphorus-doped silica soot body needs to use $Yb^{3+}$, $Al^{3+}$, $P^{5+}$ tri-doped silica transparent sol solution; a prepared method of the $Yb^{3+}$, $Al^{3+}$, $P_5\pm$tri-doped silica transparent sol solution includes step S1: first weighing the ytterbium source, aluminum source, and phosphoric acid according to preset molar percentages, then preparing a mixed solution of ethyl orthosilicate, water, and ethanol, and finally adding the ytterbium source, aluminum source, and phosphoric acid in sequence into the mixed solution. After the mixed solution is fully mixed, a $Yb^{3+}$, $Al^{3+}$, and $P^{5+}$ tri-doped silica transparent sol solution can be obtained.

In another preferred example, preparing the ytterbiumaluminumphosphorus-doped silica soot body includes the following steps:

S2: Polishing, injecting sulfur hexafluoride and oxygen into the deposition tube, then heating the deposition tube to 2000° C., and chemically polishing the inner wall of the deposition tube;

S3: Depositing, injecting silicon tetrachloride and oxygen to the polished deposition tube, heating the deposition tube to 1400-1600° C., and depositing silica soot body;

S4: Soaking, immersing part of the deposition tube in the silica transparent sol solution described in step S1 to obtain a ytterbium-aluminum-phosphorus-doped silica soot body;

In another preferred example, the preparation method for the photodarkening-resistant ytterbium-doped silica optical fiber after dehydration, decarburization, collapse, and fiber drawing of the ytterbium-aluminum-phosphorus-doped silica soot body includes the following steps:

S5: Dehydrating, injecting chlorine and oxygen into the deposition tube obtained in step S4, and heating the deposition tube to 900-1100° C. to complete the dehydration process;

S6: Decarburizing, continue to feed oxygen and helium into the deposition tube, and heating the deposition tube to 1100-1300° C. to complete the decarburization process;

S7: Collapsing, heating the deposition tube to above 2200° C., and shrinking the deposition tube into a solid rod to complete the preparation of the optical fiber preform;

S8: Optical fiber drawing, placing the optical fiber preform in the optical fiber drawing tower to form an optical fiber, and when the outer diameter of the optical fiber meets the requirements, glue is applied to the outside of the optical fiber and cured to obtain the desired optical fiber.

In another preferred example, the ytterbium source and the aluminum source are respectively ytterbium chloride hexahydrate and aluminum chloride hexahydrate.

In another preferred example, the molar percentages of the ytterbium source, aluminum source and phosphoric acid are 0.05-0.3 mol %, 1-3 mol %, 1-5 mol % respectively, and the volume ratio of ethyl orthosilicate, water, and ethanol in the mixed solution is 1:5:10.

In another preferred example, the flow rates of sulfur hexafluoride and oxygen in the step S2 are 50 sccm and 1000 sccm, respectively, and the heating is specifically 100 mm/min in a unidirectional positive direction. The flow rates of silicon tetrachloride and oxygen in the step S3 are 200 sccm and 500-2000 sccm, respectively, and the heating is specifically 100 mm/min in a unidirectional positive direction. The soaking time in the step S4 is greater than 30 minutes.

In another preferred example, the flow rates of chlorine and oxygen in the step S5 are 100 sccm and 1000 sccm, respectively, and the heating is 100 mm/min in a unidirectional positive direction. The flow rates of oxygen and helium in the step S6 are 1000 sccm and 1000 sccm, respectively, and the heating is 100 mm/min in a unidirectional positive direction. The heating in the step S7 specifically includes first moving forward at 20 mm/min, repeating 3-5 times, and then moving backward at 10 mm/min.

In another preferred example, step S80 is further included before the step S8, which processes the prepared optical fiber preform into a regular octagon.

In another preferred example, the glue coated in the step S8 is two layers, the inner layer is a low refractive index coating glue, and the outer layer is a high refractive index coating glue, which are respectively used as the outer layer structure and the retaining layer, to make a double-clad fiber.

In another preferred example, the heating tool in the steps S2-S7 is oxyhydrogen flame, and the curing method in the step S8 is light curing or thermal curing.

The third aspect of the present invention provides a photodarkening-resistant ytterbium-doped silica optical fiber, and the fiber is prepared by a preparation method, which at least includes the method according to the second aspect, and the glass of the fiber core rod at least includes $Yb_2O_3$, $Al_2O_3$, $P_2O_5$, $SiO_2$, wherein, the proportions of $Yb_2O_3$, $Al_2O_3$ and $P_2O_5$ in the entire substance are respectively: $Yb_2O_3$:0.05~0.3 mol %, $Al_2O_3$:1~3 mol %, $P_2O_5$:1~5 mol %, and the rest is $SiO_2$.

It should be appreciated that, within the scope of the present invention, the above-mentioned technical features of the present invention and the technical features specifically described in the following (such as the embodiments) can be combined with each other to form a new or preferred technical solution. It will not repeat them here due to space limitations.

DETAILED DESCRIPTION

Aiming at the shortcomings of the prior art, the present invention discloses an optical fiber for inhibiting the photodarkening of ytterbium-doped silica optical fiber and a preparation method therefor. The present invention combines the Sol-Gel and the improved chemical vapor deposition method (MCVD), and respectively utilizes its molecular-level doping uniformity and low-loss preparation advantages, effectively doping the ytterbium ions, aluminum ions, and phosphorus ions in the quartz matrix, which effectively solves the high optical fiber loss, the photodarkening caused by clusters, etc, and the refractive index center depression problems. The various indicators of the present invention fully meet the requirements of commercial optical fiber: it can achieve a power reduction of up to 5% under the condition of 1000 W pumping conditions for 500 hours, while the loss is as low as 15 dB/km, while the loss is as low as 15 dB/km, and the laser efficiency is greater than 80% when the ytterbium ion doping concentration reaches 0.3 mol %, which is suitable for large-scale industrial fabrication.

THE TECHNICAL SOLUTION OF THE PRESENT INVENTION IS AS FOLLOWS

A photodarkening-resistant ytterbium-doped silica optical fiber is provided, and the glass of the fiber core rod at least includes $Yb_2O_3$, $Al_2O_3$, $P_2O_5$, $SiO_2$, wherein, the proportions of $Yb_2O_3$, $Al_2O_3$ and $P_2O_5$ in the entire substance are respectively: $Yb_2O_3$:0.05~0.3 mol %, $Al_2O_3$:1~3 mol %, $P_2O_5$:1~5 mol %.

A preparation method for the photodarkening-resistant ytterbium-doped silica optical fiber is provided. The preparation method at least includes: applying a sol-gel method and an immersion method to an improved chemical vapor deposition method to prepare a ytterbium-aluminum-phosphorus-doped silica soot body, and then after dehydration, decarburization, collapse, and drawing, a photodarkening-resistant silica optical fiber is finally prepared.

Figure 1:
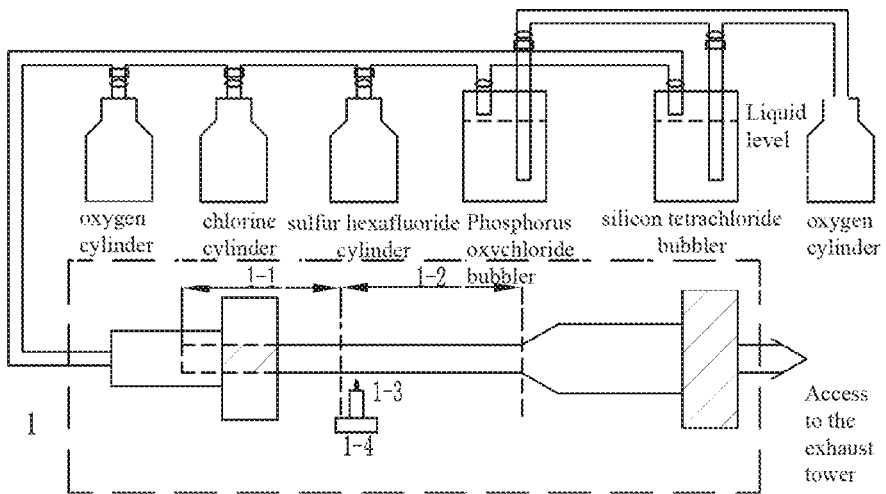
FIG. 1 is a schematic diagram of the structure of an improved chemical vapor deposition system (MCVD equipment) used in the present invention; where each number represents: 1 is a lathe, 1-1 is a front-end tube, 1-2 is a deposition tube, and 1-3 is a heating tool (oxyhydrogen flame), 1-4 is a (movable) heating base.

The structure of a typical improved chemical vapor deposition system (MCVD equipment) is shown in FIG. 1, wherein each number represents: 1 is a lathe, 1-1 is a front-end tube, 1-2 is a deposition tube, and 1-3 is a heating tool (oxyhydrogen flame), 1-4 is a (movable) heating base.

Preferably, the preparation of the ytterbium-aluminum-phosphorus-doped silica soot body needs to use $Yb^{3+}$, $Al^{3+}$, $P^{5+}$ tri-doped silica transparent sol solution; a prepared method of the $Yb^{3+}$, $Al^{3+}$, $P^{5'}$ tri-doped silica transparent sol solution includes step S1: first weighing the ytterbium source, aluminum source, and phosphoric acid according to preset molar percentages, then preparing a mixed solution of ethyl orthosilicate, water, and ethanol, and finally adding the ytterbium source, aluminum source, and phosphoric acid in sequence into the mixed solution. After the mixed solution is fully mixed, a $Yb^{3+}$, $Al^{3+}$, and $P^{5+}$ tri-doped silica transparent sol solution can be obtained. $Yb^{3+}$, $Al^{3+}$, and $P^{5+}$ are uniformly dispersed in the transparent sol solution and can be stored stably.

Preferably, preparing the ytterbiumaluminumphosphorus-doped silica soot body includes the following steps:

S2: Polishing, injecting sulfur hexafluoride and oxygen into the deposition tube, then heating the deposition tube to 2000° C., and chemically polishing the inner wall of the deposition tube;

S3: Depositing, injecting silicon tetrachloride and oxygen to the polished deposition tube, heating the deposition tube to 1400-1600° C., and depositing silica soot body;

S4: Soaking, immersing part of the deposition tube in the silica transparent sol solution described in step S1, and after a period of time, a ytterbium-aluminum-phosphorus-doped silica soot body is obtained;

The preparation method for the photodarkening-resistant ytterbium-doped silica optical fiber after dehydration, decarburization, collapse, and fiber drawing of the ytterbium-aluminum-phosphorus-doped silica soot body includes the following steps:

S5: Dehydrating, injecting chlorine and oxygen into the deposition tube obtained in step S4, and heating the deposition tube to 900-1100° C. to complete the dehydration process;

S6: Decarburizing, continue to feed oxygen and helium into the deposition tube, and heating the deposition tube to 1100-1300° C. to complete the decarburization process;

S7: Collapsing, heating the deposition tube to above 2200° C. and shrinking the deposition tube into a solid rod to complete the preparation of the optical fiber preform;

S8: Optical fiber drawing, placing the optical fiber preform in the optical fiber drawing tower to form an optical fiber, and when the outer diameter of the optical fiber meets the requirements, glue is applied to the outside of the optical fiber and cured to obtain the desired optical fiber.

In another preferred example, the ytterbium source and the aluminum source are respectively ytterbium chloride hexahydrate and aluminum chloride hexahydrate, which are beneficial for preparing a sol gel with good stability and good physical and chemical properties.

In another preferred example, the molar percentages of the ytterbium source, aluminum source and phosphoric acid are 0.05-0.3 mol %, 1-3 mol %, 1-5 mol % respectively, so that the optical fiber has the effects of good amplification, high refractive index, and suppressing photodarkening. In another preferred example, the volume ratio of ethyl orthosilicate, water, and ethanol in the mixed solution is 1:5:10, which ensures that the ytterbium source, aluminum source and phosphoric acid are uniformly dispersed in the mixed solution for a long time.

Preferably, the flow rates of sulfur hexafluoride and oxygen in the step S2 are 50 sccm and 1000 sccm, respectively, and the heating is specifically 100 mm/min in a unidirectional positive direction. Preferably, the flow rates of silicon tetrachloride and oxygen in the step S3 are 200 sccm and 500-2000 sccm, respectively, and the heating is specifically 100 mm/min in a unidirectional positive direction. Preferably, the soaking time in the step S4 is greater than 30 minutes. Preferably, the flow rates of chlorine and oxygen in the step S5 are 100 sccm and 1000 sccm, respectively, and the travelling heating is 100 mm/min in a unidirectional positive direction. Preferably, the flow rates of oxygen and helium in the step S6 are 1000 sccm and 1000 sccm, respectively, and the travelling heating is 100 mm/min in a unidirectional positive direction. Preferably, the heating in the step S7 specifically includes first moving forward at 20 mm/min, repeating 3-5 times, and then moving backward at 10 min/min.

Preferably, step S80 is further included before the step S8, which processes the prepared optical fiber preform into a regular octagon.

Preferably, the glue coated in the step S8 is two layers, the inner layer is a low refractive index coating glue, and the outer layer is a high refractive index coating glue, which are used as the outer layer structure and the retaining layer, respectively, to make a double-clad fiber.

Preferably, the heating tool in the steps S2-S7 is oxyhydrogen flame, and the entire deposition tube is heated uniformly; the curing method in the step S8 is light curing or thermal curing.

The Main Advantages of the Present Invention Include:
(1) The photodarkening-resistant ytterbium-doped silica fiber of the present invention is not only doped with ytterbium ions, but also doped with aluminum ions and phosphor ions according to a specific ratio, which solves the problem of photodarkening-resistance of the optical fiber, and ensures the low loss of the optical fiber and good laser slope efficiency.
(2) The present invention adopts the method of combining Sol-Gel and MCVD, which effectively realizes the uniform doping of $Yb^{3+}$, $Al^{3+}$, and $P^{5+}$ in the silica glass at the molecular level, solves the problem of the agglomeration of ytterbium ions, and improves the photodarkening-resistance of the optical fiber performance. When the ytterbium ion concentration in the ytterbium-doped silica fiber is 03 mol %, the power drop is less than or equal to 5% under 1000 W pump power for 500 hours, and the power drop can be as low as 1%.
(3) The present invention adopts the method of combining Sol-Gel and MCVD, and uses the MCVD method to solve the problem of high fiber loss in the original Sol-Gel method. The loss of the ytterbium-doped silica fiber of the present invention is lower than 15 db/km.
(4) The present invention adopts the method of combining Sol-Gel and MCVD, which solves the problem of the center depression of the refractive index of the ytterbium-doped silica fiber caused by the volatilization of P co-doped in MCVD and solution immersion method, and helps the fiber maintain a stablemode under high power conditions. The invention can achieve a laser slope efficiency greater than 80%.
(5) The components of the optical fiber preform prepared by the method of combining Sol-Gel and MCVD in the present invention are uniformly distributed and strictly conform to the composition ratio.

The ytterbium-doped silica fiber prepared by the method of combining Sol-Gel and MCVD in the present invention fully meets the standards of industrialization requirements.

The present invention will be further explained below in conjunction with specific examples. It should be appreciated that these examples are only used to illustrate the present invention and not to limit the scope of the present invention. The experimental methods that do not indicate specific conditions in the following examples usually follow the conventional conditions or the conditions suggested by the manufacturer.

Unless otherwise stated, percentages and parts are calculated by weight.

Example 1

The difference between the average refractive index of the ytterbium-doped silica fiber and the refractive index of pure silica glass is 0.0016, the composition of glass of the core rod is $0.2Yb_2O_3 \cdot 2Al_2O_3 \cdot 2P_2O_5 \cdot 95.8SiO_2$, and the fiber core and cladding size are 20 micrometers and 400 micrometers, respectively. The ytterbium-doped silica fiber of this example is prepared by a method of combining MCVD and Sol-Gel. The method includes the following steps:
(1) Firstly, weighing ytterbium chloride hexahydrate, aluminum chloride hexahydrate and phosphoric acid according to the composition of glass of the core rod (molar ratio) $0.2Yb_2O_3 \cdot 2Al_2O_3 \cdot 2P_2O_5 \cdot 95.8SiO_2$; preparing the mixed solution according to the volume ratio of ethyl orthosilicate: water: ethanol=1:5:10, and then adding the ytterbium chloride hexahydrate, aluminum chloride hexahydrate, and phosphoric acid to the mixed solution in sequence, stirring thoroughly at room temperature for 20 hours to obtain $Yb^{3+}$, $Al^{3+}$, $P^{5+}$ tri-doped silica transparent sol solution, which is sealed and stored for 5 days for later use;
(2) Injecting 50 sccm sulfur hexafluoride and 1000 sccm oxygen into the deposition tube (1-2), heating the deposition tube (1-2) to 2000° C. with a oxyhydrogen flame (1-3), moving the heating base (1-4) at a positive direction of 100 mm/min, and chemically polishing the inner wall of the deposition tube;
(3) Injecting 200 sccm silicon tetrachloride and 1500 sccm oxygen into the polished deposition tube (1-2), heating the deposition tube (1-2) to 1500° C. with a oxyhydrogen flame (1-3), moving the heating base (1-4) at a positive direction of 100 mm/min, and depositing a layer of silica soot body;

(4) Removing the deposition tube (1-2) and the front-end tube (1-1), and immersing vertically part of the deposition tube (1-2) in the $Yb^{3+}$, $Al^{3+}$, and $P^{5+}$ tri-doped silica transparent sol solution for 30 minutes to obtain a layer of ytterbium-aluminum-phosphorus-doped silica soot body in the deposition tube 1-2;

(5) Putting the immersed deposition tube (1-2) and front end tube (1-1) back on the lathe (1), injecting 100 sccm chlorine and 1000 sccm oxygen into the deposition tube (1-2), heating the deposition tube (1-2) to 1000° C. with a oxyhydrogen flame (1-3), and moving the lamp base (1-4) at a positive direction of 100 mm/min to complete the dehydration process;

(6) Injecting 1000 sccm oxygen and 1000 sccm helium into the deposition tube (1-2), heating the deposition tube (1-2) to 1200° C. with a oxyhydrogen flame (1-3), and moving the heating base (1-4) at a positive direction of 100 mm/min to complete the decarburization process;

(7) Heating the deposition tube (1-2) to above 2200° C. with a oxyhydrogen flame (1-3), moving the heating base (1-4) at a positive direction of 20 mm/min, repeating three times, and finally shrinking the deposition tube (1-2) into a solid rod by moving the heating base (1-4) in a reverse direction of 10 mm/min to complete the preparation of the optical fiber preform.

Figure 2:
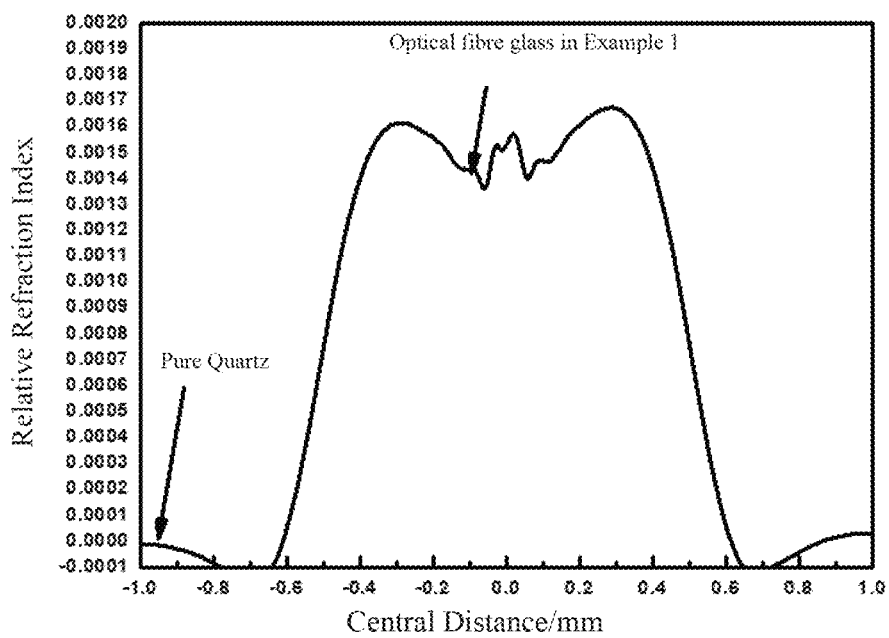
FIG. 2 is a refractive index profile of the preform prepared in example 1 of the present invention.
Figure 3:
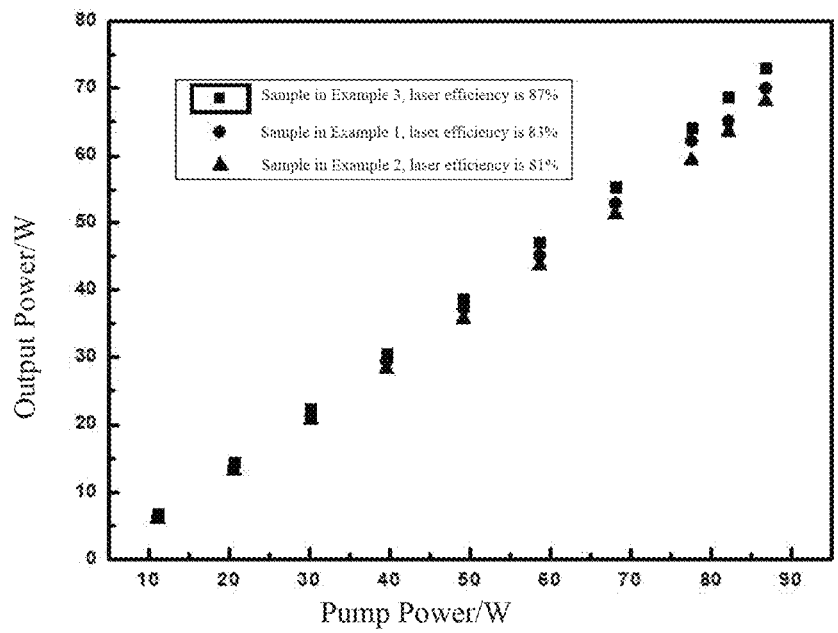
FIG. 3 shows the input and output results of the ytterbium-doped silica fiber laser prepared in examples 1-3 of the present invention.
Figure 4:
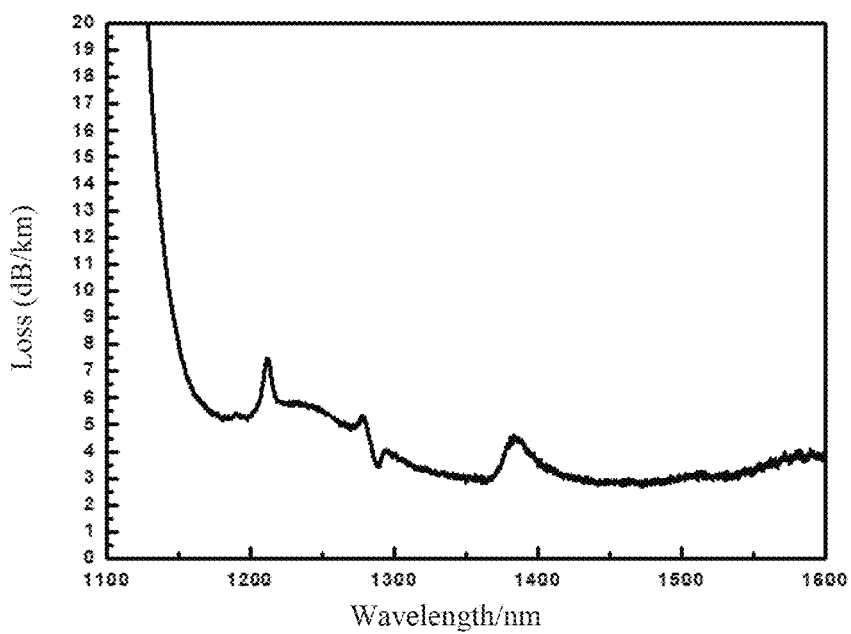
FIG. 4 is the absorption loss spectrum of the ytterbium-doped silica fiber prepared in example 1 of the present invention.
Figure 5:
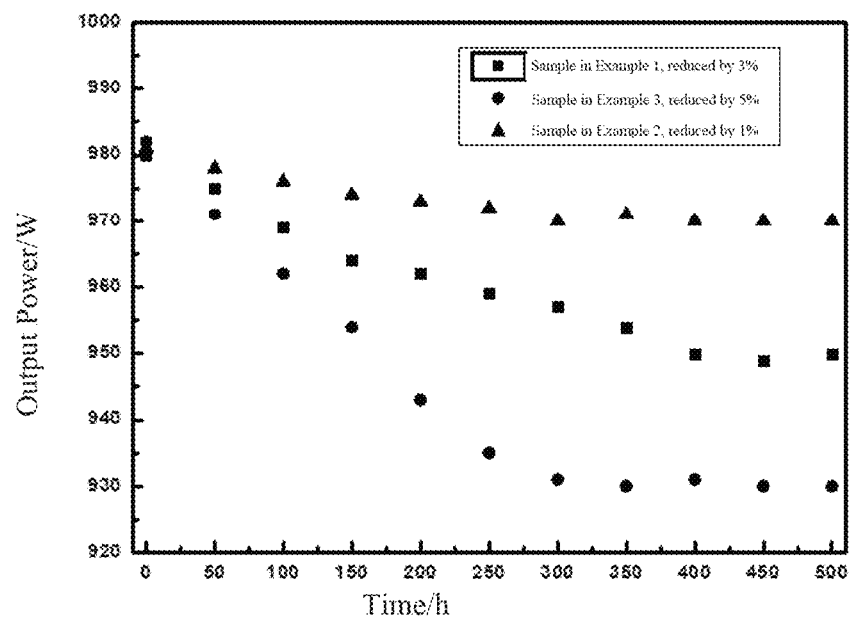
FIG. 5 is a photodarkening curve of ytterbium-doped silica fiber prepared in examples 1-3 of the present invention.

(8) Processing the prepared optical fiber preform into a regular octagon, and the ratio of the diameter of the fiber core to the face-to-face distance of the octagon is 1:20;

(9) Clamping the preform on the feeding end of the optical fiber drawing tower, and lower its lower end to the high temperature position of the drawing heating furnace. Waiting for the temperature of the drawing heating furnace to rise to the drop temperature of 2200° C., at which temperature the lower end of the preform will soften and fall slowly by gravity to form an optical fiber. Reducing the temperature of the heating furnace to the drawing temperature of 2000° C., turning on the drawing traction wheel, and drawing the fiber at a speed of 10 m/min, turning on the coating device and UV curing oven when the outer diameter of the fiber (the face-to-face length of the octagon is 400 μm) meets the requirements, and applying two layers of coating glue on the surface of the optical fiber, wherein the inner layer is a low refractive index coating glue as the outer layer structure of the double-clad fiber, and the outer layer is a high refractive index coating glue as the holding layer of the double-clad fiber, coiling the drawn optical fiber on the optical fiber tray through the winding machine;

(10) Testing:
PK2600 refractive index profile tester is used to test the refractive index distribution. As shown in FIG. 2, there is no pit in the center of the refractive index distribution and the refractive index fluctuation is less than $2\times10^{-4}$;

Using the FP linear cavity to test the output of the ytterbium-doped silica optical fiber laser obtained in example 1, wherein the pump wavelength is 970 nm. As shown in FIG. 3, the slope efficiency is 83%;

The loss of the quartz fiber obtained in example 1 is tested by the truncation method: FIG. 4 shows the loss spectrum. The background loss at 1200 nm is 7.5 dB/km, indicating that the scattering points and impurity pollution are very low. The hydroxyl absorption at 1383 nm is 5 dB/km, showing that the process has a good dehydration effect;

The photodarkening test uses a 1200 W semiconductor laser with a working wavelength of 915 nm as the pump source, and recording the relationship between the output power and the time, as shown in FIG. 5, the power drop is 3% for 500 hours.

Example 2

The difference between the average refractive index of the ytterbium-doped silica fiber and the refractive index of pure silica glass is 0.005, the composition of glass of the core rod is $0.05Yb_2O_3 \cdot 1Al_2O_3 \cdot 1P_2O_5 \cdot 97.95SiO_2$, the fiber core and cladding size are 30 microns and 600 microns, respectively. The ytterbium-doped silica fiber of this example is prepared by a method of combining MCVD and Sol-Gel. The method includes the following steps:

(1) Firstly, weighing ytterbium chloride hexahydrate, aluminum chloride hexahydrate and phosphoric acid according to the composition of glass of the core rod (molar ratio) $0.05Yb_2O_3 \cdot 1Al_2O_3 \cdot 1P_2O_5 \cdot 97.95SiO_2$; preparing the mixed solution according to the volume ratio of ethyl orthosilicate: water: ethanol=1:5:10, and then adding the ytterbium chloride hexahydrate, aluminum chloride hexahydrate, and phosphoric acid to the mixed solution in sequence, stirring thoroughly at room temperature for 20 hours to obtain $Yb^{3+}$, $Al^{3+}$, $P^{5+}$ tri-doped silica transparent sol solution, which is sealed and stored for 5 days for later use;

(2) Injecting 50 sccm sulfur hexafluoride and 1000 sccm oxygen into the deposition tube (1-2), heating the deposition tube (1-2) to 2000° C. with a oxyhydrogen flame (1-3), moving the heating base (1-4) at a positive direction of 100 mm/min, and chemically polishing the inner wall of the deposition tube;

(3) Injecting 200 sccm silicon tetrachloride and 500 sccm oxygen into the polished deposition tube (1-2), heating the deposition tube (1-2) to 1400-1600° C. with a oxyhydrogen flame (1-3), moving the heating base (1-4) at a positive direction of 100 mm/min, and depositing a layer of silica soot body;

(4) Removing the deposition tube (1-2) and the front-end tube 1-1, and immersing vertically part of the deposition tube (1-2) in the $Yb^{3+}$, $Al^{3+}$, and $P^{5+}$ tri-doped silica transparent sol solution for 30 minutes to obtain a layer of ytterbium-aluminum-phosphorus-doped silica soot body in the deposition tube (1-2);

(5) Putting the immersed deposition tube (1-2) and front end tube (1-1) back on the lathe (1), injecting 100 sccm chlorine and 1000 sccm oxygen into the deposition tube (1-2), heating the deposition tube (1-2) to 900-1100° C. with a oxyhydrogen flame (1-3), and moving the heating base (1-4) at a positive direction of 100 mm/min to complete the dehydration process;

(6) Injecting 1000 sccm oxygen and 1000 sccm helium into the deposition tube (1-2), heating the deposition tube (1-2) to 1100° C. with a oxyhydrogen flame (1-3), and moving the heating base (1-4) at a positive direction of 100 mm/min to complete the decarburization process;

(7) Heating the deposition tube (1-2) to above 2200° C. with a oxyhydrogen flame (1-3), moving the heating base (1-4) at a positive direction of 20 mm/min, repeating three times, and finally shrinking the deposition tube (1-2) into a solid rod by moving the heating base (1-4) in a reverse direction of 10 mm/min to complete the preparation of the optical fiber preform.

Figure 6:
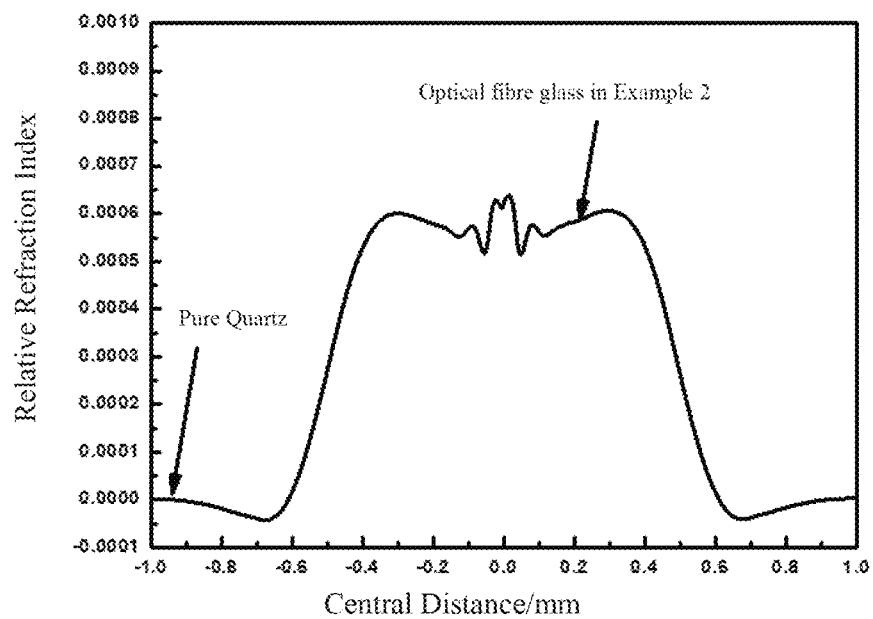
FIG. 6 is a refractive index profile of the preform prepared in example 2 of the present invention.
Figure 7:
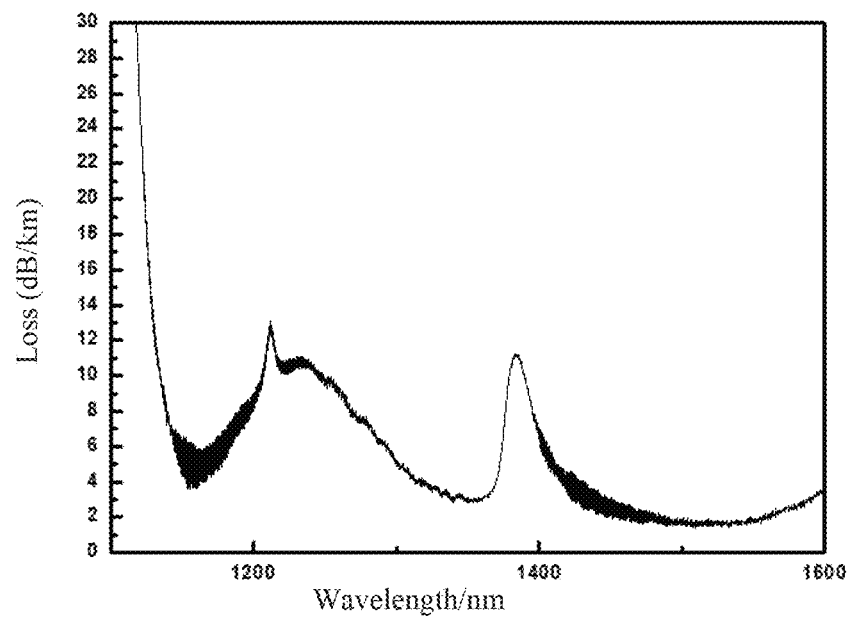
FIG. 7 is the absorption loss spectrum of the ytterbium-doped silica fiber prepared in example 2 of the present invention.

(8) Processing the prepared optical fiber preform into a regular octagon, and the ratio of the diameter of the fiber core to the face-to-face distance of the octagon is 1:20;

(9) Clamping the preform on the feeding end of the optical fiber drawing tower, and lower its lower end to the high temperature position of the drawing heating furnace. Waiting for the temperature of the drawing heating furnace to rise to the drop temperature of 2200° C., at which temperature the lower end of the preform will soften and fall slowly by gravity to form an optical fiber. Reducing the temperature of the heating furnace to the drawing temperature of 2000° C., turning on the drawing traction wheel, and drawing the fiber at a speed of 10 m/min, turning on the coating device and thermal curing oven when the outer diameter of the fiber (the face-to-face length of the octagon is 600 μm) meets the requirements, and applying two layers of coating glue on the surface of the optical fiber, wherein the inner layer is a low refractive index coating glue as the outer layer structure of the double-clad fiber, and the outer layer is a high refractive index coating glue as the holding layer of the double-clad fiber, coiling the drawn optical fiber on the optical fiber tray through the winding machine;

(10) Testing:

PK2600 refractive index profile tester is used to test the refractive index distribution. As shown in FIG. 6, there is no pit in the center of the refractive index distribution and the refractive index fluctuation is less than $2 \times 10^{-4}$;

Using the FP linear cavity to test the output of the ytterbium-doped silica optical fiber laser obtained in example 2, wherein the pump wavelength is 970 nm. As shown in FIG. 3, the slope efficiency is 81%;

The loss of the quartz fiber obtained in example 2 is tested by the truncation method: FIG. 7 shows the loss spectrum. The background loss at 1200 nm is 8 db/km, and the hydroxyl absorption at 1383 nm is 12 db/km;

The photodarkening test uses a 1200 W semiconductor laser with a working wavelength of 915 nm as the pump source, and recording the relationship between the output power and the time, as shown in FIG. 5, the power drop is 1% for 500 hours.

Example 3

The difference between the average refractive index of the ytterbium-doped silica fiber and the refractive index of pure silica glass is 0.0023, the composition of glass of the core rod is $3Yb_2O_3 \cdot 3Al_2O_3 \cdot 5P_2O_5 \cdot 91.7SiO_2$, and the fiber core and cladding size are 25 micrometers and 400 micrometers, respectively. The ytterbium-doped silica fiber of this example is prepared by a method of combining MCVD and Sol-Gel. The method includes the following steps:

(1) Firstly, weighing ytterbium chloride hexahydrate, aluminum chloride hexahydrate and phosphoric acid according to the selected composition of glass of the core rod (molar ratio) $3Yb_2O_3 \cdot 3Al_7O_3 \cdot 5P_2O_5 \cdot 91.7SiO_7$; preparing the mixed solution according to the volume ratio of ethyl orthosilicate: water: ethanol=1:5:10, and then adding the ytterbium chloride hexahydrate, aluminum chloride hexahydrate, and phosphoric acid to the mixed solution in sequence, stirring thoroughly at room temperature for 20 hours to obtain $Yb^{3+}$, $Al^{3+}$, $P^{5+}$ tri-doped silica transparent sol solution, which is sealed and stored for 5 days for later use;

(2) Injecting 50 sccm sulfur hexafluoride and 1000 sccm oxygen into the deposition tube (1-2), heating the deposition tube (1-2) to 2000° C. with a oxyhydrogen flame lamp (1-3), moving the heating base (1-4) at a positive direction of 100 mm/min, and chemically polishing the inner wall of the deposition tube;

(3) Injecting 200 sccm silicon tetrachloride and 2000 sccm oxygen into the polished deposition tube (1-2), heating the deposition tube (1-2) to 1600° C. with a oxyhydrogen flame lamp (1-3), moving the heating base (1-4) at a positive direction of 100 mm/min, and depositing a layer of silica soot body;

(4) Removing the deposition tube (1-2) and the front-end tube (1-1), and immersing vertically part of the deposition tube (1-2) in the $Yb^{3+}$, $Al^{3+}$, and $P^{5+}$ tri-doped silica transparent sol solution for 40 minutes to obtain a layer of ytterbium-aluminum-phosphorus-doped silica soot body in the deposition tube (1-2);

(5) Putting the immersed deposition tube (1-2) and front end tube (1-1) back on the lathe (1), injecting 100 sccm chlorine and 1000 sccm oxygen into the deposition tube (1-2), heating the deposition tube (1-2) to 1100° C. with a oxyhydrogen flame (1-3), and moving the heating base (1-4) at a positive direction of 100 mm/min to complete the dehydration process;

(6) Injecting 1000 sccm oxygen and 1000 sccm helium into the deposition tube (1-2), heating the deposition tube (1-2) to 1300° C. with a oxyhydrogen flame lamp (1-3), and moving the heating base (1-4) at a positive direction of 100 mm/min to complete the decarburization process;

(7) Heating the deposition tube (1-2) to above 2200° C. with a oxyhydrogen flame lamp (1-3), moving the heating base (1-4) at a positive direction of 20 mm/min, repeating three times, and finally shrinking the deposition tube (1-2) into a solid rod by moving the heating base (1-4) in a reverse direction of 10 mm/min to complete the preparation of the optical fiber preform.

Figure 8:
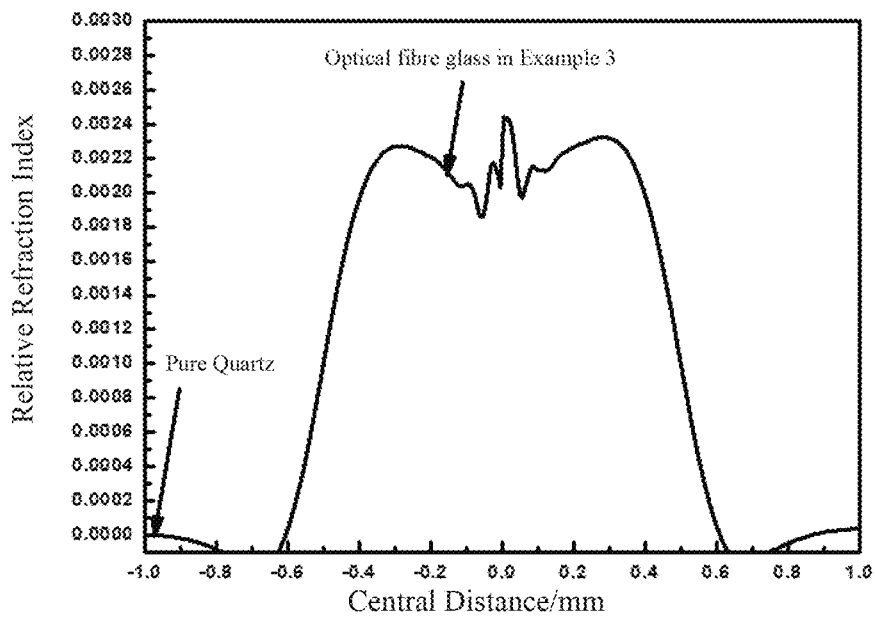
FIG. 8 is a refractive index profile of the preform prepared in example 3 of the present invention.
Figure 9:
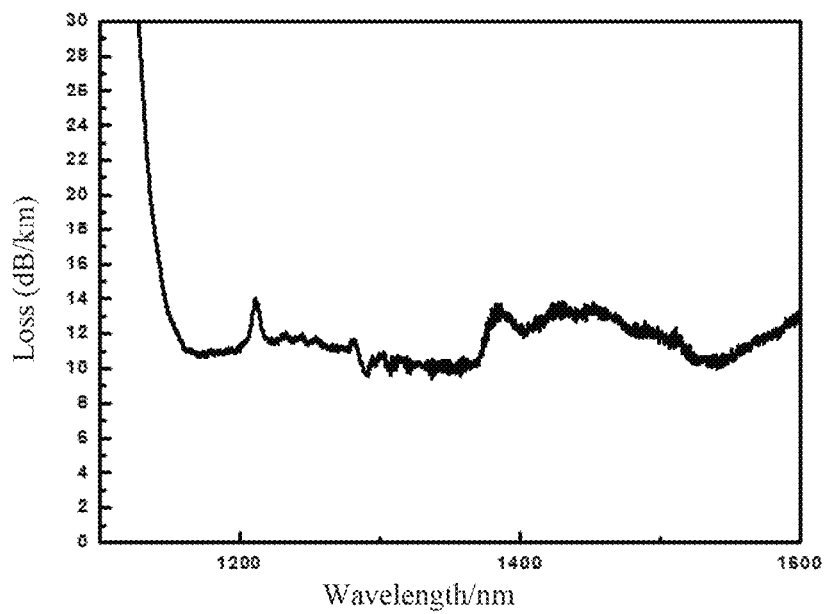
FIG. 9 is the absorption loss spectrum of the ytterbium-doped silica fiber prepared in example 3 of the present invention.

(8) Processing the prepared optical fiber preform into a regular octagon, and the ratio of the diameter of the fiber core to the face-to-face distance of the octagon is 1:16;

(9) Clamping the preform on the feeding end of the optical fiber drawing tower, and lower its lower end to the high temperature position of the drawing heating furnace. Waiting for the temperature of the drawing heating furnace to rise to the drop temperature of 2200° C., at which temperature the lower end of the preform will soften and fall slowly by gravity to form an optical fiber. Reducing the temperature of the heating furnace to the drawing temperature of 2000° C., turning on the drawing traction wheel, and drawing the fiber at a speed of 10 m/min, turning on the coating device and UV curing oven when the outer diameter of the fiber (the face-to-face length of the octagon is 400 μm) meets the requirements, and applying two layers of coating glue on the surface of the optical fiber, wherein the inner layer is a low refractive index coating glue as the outer layer structure of the double-clad fiber, and the outer layer is a high refractive index coating glue as the holding layer of the double-clad fiber, coiling the drawn optical fiber on the optical fiber tray through the winding machine;

(10) Testing:

PK2600 refractive index profile tester is used to test the refractive index distribution. As shown in FIG. 8, there is no pit in the center of the refractive index distribution and the refractive index fluctuation is less than $3\times10^{-4}$;

Using the FP linear cavity to test the output of the ytterbium-doped silica optical fiber laser obtained in example 3, wherein the pump wavelength is 970 nm. As shown in FIG. 3, the slope efficiency is 87%;

The loss of the quartz fiber obtained in example 1 is tested by the truncation method: FIG. 9 shows the loss spectrum. The background loss at 1200 nm is 14 dB/km, and the hydroxyl absorption at 1383 nm is 12 dB/km;

The photodarkening test uses a 1200 W semiconductor laser with a working wavelength of 915 nm as the pump source, and recording the relationship between the output power and the time, as shown in FIG. 5, the power drop is 5% for 500 hours.

All documents mentioned in the present invention are cited as references, as if each document was individually cited as a reference. In addition, it should be understood that after reading the above teaching content of the present invention, those skilled in the art can make various changes or modifications to the present invention, and these equivalent forms also fall within the scope defined by the appended claims of the present application.

What is claimed is:

1. A preparation method for a photodarkening-resistant ytterbium-doped silica optical fiber, wherein, the preparation method at least includes: applying a sol-gel method and an immersion method to an improved chemical vapor deposition method to prepare a ytterbium-aluminum-phosphorus-doped silica soot body, and then after dehydration, decarburization, collapse, and drawing, a photodarkening-resistant silica optical fiber is finally prepared, wherein a silica transparent sol solution is obtained by at least the following step S1: first weighing an ytterbium source, aluminum source, and phosphoric acid according to preset molar percentages, then preparing a mixed solution of ethyl orthosilicate, water, and ethanol, and finally adding the ytterbium source, aluminum source, and phosphoric acid in sequence into the mixed solution, and after the mixed solution is fully mixed, the silica transparent sol solution can be obtained, wherein preparing the ytterbium-aluminum-phosphorus-doped silica soot body comprises the following steps:

S2: Polishing, injecting sulfur hexafluoride and oxygen into a deposition tube, then heating the deposition tube to 2000° C., and chemically polishing the inner wall of the deposition tube;

S3: Depositing, injecting silicon tetrachloride and oxygen to the polished deposition tube, heating the deposition tube to 1400-1600° C., and depositing silica soot body;

S4: Soaking, immersing part of the deposition tube in the silica transparent sol solution described in step S1 to obtain the ytterbium-aluminum-phosphorus-doped silica soot body.

2. The preparation method for the photodarkening-resistant ytterbium-doped silica optical fiber according to claim 1, wherein the transparent silica transparent sol solution is a $Yb^{3+}$, $Al^{3+}$, and $P^{5+}$ triple-doped transparent silica transparent sol solution.

3. The preparation method for the photodarkening-resistant ytterbium-doped silica optical fiber according to claim 1, wherein, the preparation method for preparing the photodarkening-resistant ytterbium-doped silica optical fiber after dehydration, decarburization, collapse, and fiber drawing of the ytterbium-aluminum-phosphorus-doped silica soot body includes the following steps:

S5: Dehydrating, injecting chlorine and oxygen into the deposition tube obtained in step S4, and heating the deposition tube to 900-1100° C. to complete the dehydration process;

S6: Decarburizing, continue to feed oxygen and helium into the deposition tube, and heating the deposition tube to 1100-1300° C. to complete the decarburization process;

S7: Collapsing, heating the deposition tube to above 2200° C., and shrinking the deposition tube into a solid rod to complete the preparation of the optical fiber preform;

S8: Optical fiber drawing, placing the optical fiber preform in the optical fiber drawing tower to form an optical fiber, and when the outer diameter of the optical fiber meets the requirements, glue is applied to the outside of the optical fiber and cured to obtain the desired optical fiber.

4. The preparation method for the photodarkening-resistant ytterbium-doped silica optical fiber according to claim 1, wherein, the ytterbium source and aluminum source are respectively ytterbium chloride hexahydrate and aluminum chloride hexahydrate.

5. The preparation method for the photodarkening-resistant ytterbium-doped silica optical fiber according to claim 1, wherein, the molar percentages of the ytterbium source, aluminum source and phosphoric acid are 0.05-0.3 mol %, 1-3 mol %, 1-5 mol %, and the volume ratio of ethyl orthosilicate, water, and ethanol in the mixed solution is 1:5:10.

6. The preparation method for the photodarkening-resistant ytterbium-doped silica optical fiber according to claim 1, wherein, the flow rates of sulfur hexafluoride and oxygen in the step S2 are 50 sccm and 1000 sccm, respectively, and the heating is specifically 100 mm/min in a unidirectional positive movement of; the flow rates of silicon tetrachloride and oxygen in the step S3 are 200 sccm and 500-2000 sccm, respectively, and the heating is specifically 100 mm/m in a unidirectional positive direction; the soaking time in step S4 is greater than 30 minutes.

7. The preparation method for the photodarkening-resistant ytterbium-doped silica optical fiber according to claim 3, wherein, the flow rates of chlorine and oxygen in the step S5 are 100 sccm and 1000 sccm, respectively, and the heating is 100 mm/min in a unidirectional positive direction; the flow rates of oxygen and helium in the step S6 are 1000 sccm and 1000 sccm, respectively, and the heating is 100 mm/min in a unidirectional positive direction; the heating in the step S7 specifically includes first moving forward at 20 mm/min, repeating 3-5 times, and then moving backward at 10 mm/min.

8. The preparation method for the photodarkening-resistant ytterbium-doped silica optical fiber according to claim 3, wherein the method further comprises a step S80 before the step S8, wherein the S80 is processing the prepared optical fiber preform into a regular octagon.

9. The preparation method for the photodarkening-resistant ytterbium-doped silica optical fiber according to claim 3, wherein, the glue coated in the step S8 is two layers, the inner layer is a low refractive index coating glue, and the outer layer is a high refractive index coating glue, which are respectively used as the outer layer structure and the retaining layer, to make a double-clad fiber.

10. The preparation method for the photodarkening-resistant ytterbium-doped silica optical fiber according to claim

3, wherein, the heating tool in the steps S2-S7 is oxyhydrogen flame, the curing method in the step S8 is light curing or thermal curing.

\* \* \* \* \*